United States Patent Office 3,582,292
Patented June 1, 1971

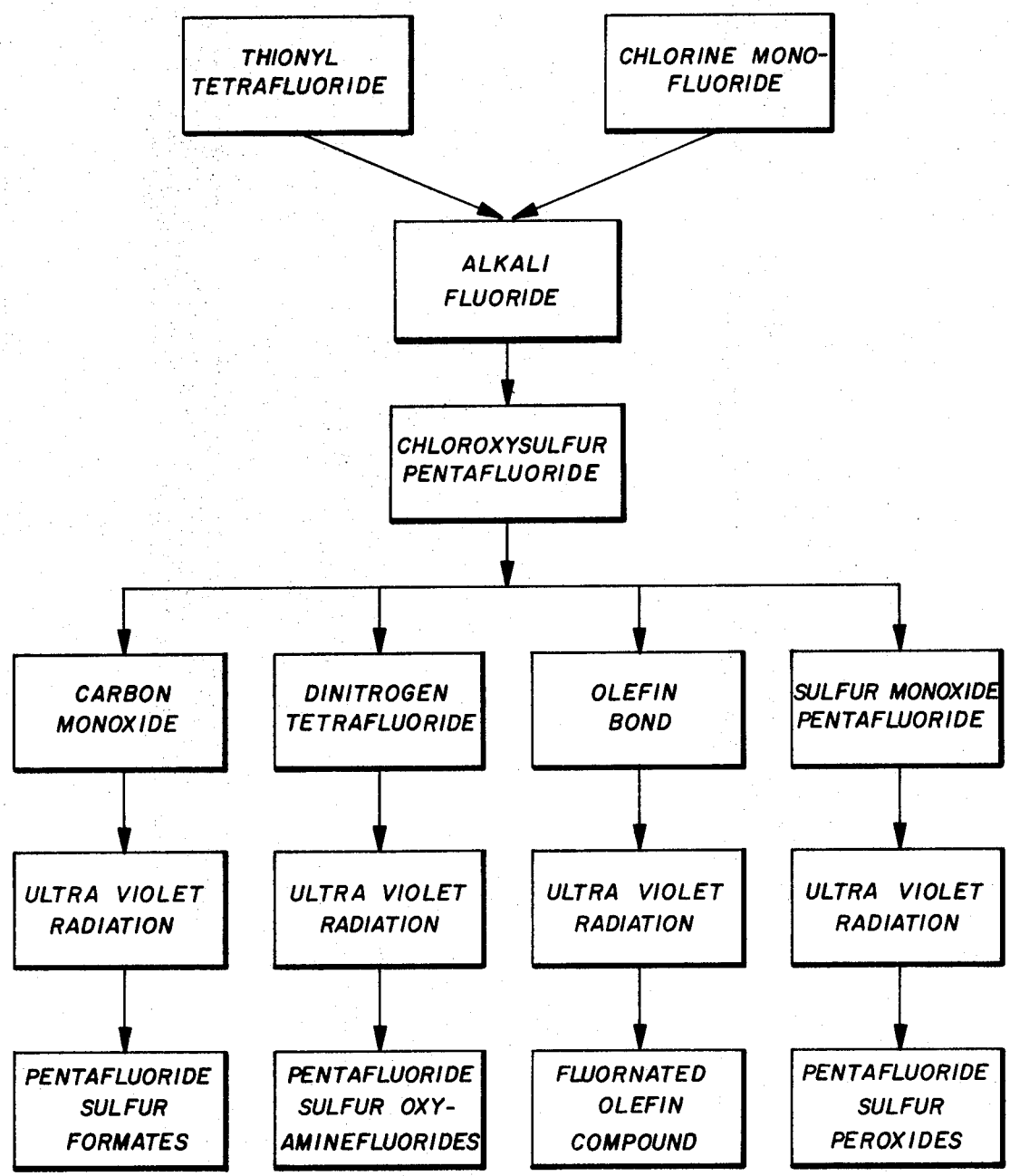

3,582,292
CHLOROXYSULFURPENTAFLUORIDE AND
DERIVATIVES THEREOF
Carl J. Schack, Chatsworth, and Richard D. Wilson,
Canoga Park, Calif., assignors to North American Rockwell Corporation
Filed Sept. 27, 1968, Ser. No. 763,141
Int. Cl. C01b 17/45; C07c 161/00
U.S. Cl. 23—367                                          3 Claims

ABSTRACT OF THE DISCLOSURE

The compounds chloroxysulfurpentafluoride and pentafluorosulfur chloroformate are provided. These compounds are useful as polymerization initiators for fluoroolefins. A method is also provided for preparing chloroxysulfurpentafluoride by reacting thionyl tetrafluoride and chlorine monofluoride in the presence of potassium fluoride, rubidium fluoride, or cesium fluoride. The compounds pentafluorosulfurchloroformate, pentafluorosulfuroxydifluoramine and pentafluorosulfurperoxide are prepared by reacting chloroxysulfurpentafluoride with carbon monoxide, dinitrogen tetrafluoride and sulfur monoxide pentafluoride, respectively.

BACKGROUND OF THE INVENTION

The invention herein described was made in the course of or under a contract with the Department of the Navy.

This invention relates to the new compound chloroxysulfurpentafluoride ($SF_5OCl$) which is prepared in nearly quantitative yields by reacting chlorine monofluoride (ClF) and thionyl tetrafluoride ($SOF_4$) in the presence of a member selected from the group consisting of potassium fluoride (KF), rubidium fluoride (RbF) and cesium fluoride (CsF). The newly formed $SF_5OCl$, because of the high reactivity of its Cl—O bond is a reactive source for the introduction of the $SF_5$—O group into organic compounds. For example, pentafluorosulfur chloroformate [$SF_5$—OC(O)Cl] can be prepared by reacting $SF_5OCl$ with carbon monoxide (CO) in the presence of ultra violet light to give the desired reaction product. Other compounds that can be prepared according to the lattter reaction are pentafluorosulfurperoxide ($SF_5OOSF_5$) and pentafluorosulfur oxydifluoramine ($SF_5ONF_2$).

SUMMARY OF THE INVENTION

Synthesis of the new compound, chloroxysulfurpentafluoride can be accomplished by means of the alkali metal fluoride catalyzed addition of ClF to $SOF_4$ at −40° to −78° C. The synthesis can be represented by the chemical equation

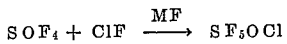

where M is K, Cs, or Rb. The compound $SF_5OCl$ can be photochemically reacted to give $SF_5OOSF_5$ according to the equation

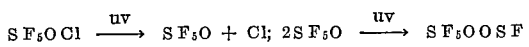

The compound $SF_5ONF_2$ can also be prepared from $SF_5OCl$ according to the equation

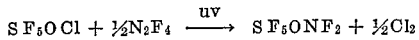

The compound $SF_5OC(O)Cl$ can be prepared from

by the reaction

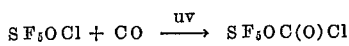

In the above equation uv represents ultra violet radiation.

DESCRIPTION OF PREFERRED EMBODIMENT

The synthetic reactions employed here were usually conducted in stainless steel cylinders and the newly formed products were separated and purified using a stainless steel-Teflon vacuum line. The reported pressures were measured by means of a commercially available Heise, Bourdon tube type, pressure gauge. Infrared spectra were taken on Perkin-Elmer Infracords 137 and 337 using 5 cm. path length stainless steel or Kel-F cells fitted with AgCl windows. The $^{19}F$ n.m.r. spectra were obtained at −40° C. using a Varian Associates high resolution n.m.r. spectrometer operating at 56.4-mc. Samples were sealed in Pyrex tubes with $CFCl_3$ as the internal standard. Mass spectral data were obtained with a conventional mass spectrometer.

The chlorine monofluoride employed herein was prepared by heating an equimolar mixture of chlorine and fluorine to 150° C. for several hours in a stainless steel cylinder. The thionyl fluoride was made from thionyl chloride and sodium fluoride in acetonitrite according to the procedures as set forth in Journal of the American Chemical Society, vol. 84, p. 4275, 1962, and it was fluorinated to thionyl tetrafluoride using elemental fluorine. The alkali metal fluorides were fused and then powdered in a drybox prior to their use. The gaseous reactants were purified by fractional condensation.

EXAMPLE 1

Preparation of $SF_5OCl$: 3.32 g. of CsF powder (21.8 mmol) was loaded into a 30 ml. prepassivated cylinder in a drybox. After evacuation, $SOF_4$(413 cm.$^3$, 18.4 mmol) and ClF (430 cm.$^3$, 19.2 mmol) were separately condensed into the reactor at −196° C. The cold bath was changed to −78° C. and the reaction allowed to proceed overnight. The products of the reaction were separated by fractional condensation at −112° C. and −196° C. as the cylinder was warmed to ambient temperature. The trap cooled at −196° C. contained 37 cm.$^3$ (1.65 mmol) which was identified by infrared examination as a mixture of unreacted ClF with minor quantities of $SOF_4$ and $SF_6$. The high temperature fraction was pure, colorless $SF_5OCl$ (402 cm.$^3$, 17.9 mmol), 97 percent yield. The preparation of $SF_5OCl$ was carried out using ClF in excess as its high volatility facilitated product separation.

In addition to the use of CsF, the catalytic activity of KF was examined and it was found to be effective in forming $SF_5OCl$. In the absence of any added CsF or KF, no reaction between ClF and $SOF_4$ occurred at either −78° C. or room temperature. Cesium fluoride appears to promote the formation of $SF_5OCl$ more readily than KF. Thus, a synthesis of $SF_5OCl$ (−10 mmol scale) using CsF gave a 15 percent yield in 1 hour at −78° C. whereas KF produced a 13 percent yield in 2 hours.

The newly formed chloroxysulfurpentafluoride is a clear, water white liquid and is stable for very limited periods at room temperature in clean, dry, prepassivated stainless steel or perhalogenated plastic equipment. Storage at −40° C. in stainless steel cylinders has resulted in only a few percent decomposition over a 3–4 week period. This decomposition can be limited to a negligible amount by low temperature storage in the presence of KF or CsF since the products of the decomposition are $SOF_4$ and ClF, i.e., the starting materials. The molecular weight of $SF_5OCl$ as determined by gas density was 177 (calculated 178.5). The vapor pressure of $SF_5OCl$ over the temperature range −65° to 0° is [given as T (° K.), P (mm.)]: 208.5, 16; 225.3, 52; 241.7, 128; 245.4, 155; 250.2, 186; 273.2, 520. The vapor pressure-temperature relationship is described by the equation log $P_{mm} = 7.57604 - 1324.37/T$ ° K. The normal boiling point calculated from the equation is 8.9° C., with a heat of vaporization of 6.06 Kcal./mole and a Trouton constant of 21.5.

EXAMPLE 2

Prepartion of $SF_5OOSF_5$: A sample of $SF_5OCl$ (70.0 cm.³, 3.12 mmol) was condensed at —196° into a Pyrex ampoule fitted with a stopcock (Halocarbon grease). The ampoule was warmed to room temperature and irradiated for 3 hours (Hanovia 100 watt utility lamp). Products of the photolysis were separated by several fractional condensations in traps cooled to —95° and —196°. Identification of the products was made from infrared spectra and mass spectra. The —196° C. trap contained 62.2 cm.³ (2.78 mmol) of a mixture consisting of 34 cm.³ $Cl_2$, 22 cm.³ $SOF_4$, 5 cm.³ $SiF_4$ and a small amount of $SO_2F_2$. No unreacted $SF_5OCl$ was observed. The high temperature fraction (23.0 cm.³, 1.02 mmol) was nearly pure $SF_5OOSF_5$. The mass cracking pattern found for $SF_5OOSF$ agreed with the pattern reported in Journal of the American Chemical Society, 83, 298, 1961. The principal ions observed: $SF_5^+$, 100; $SF_3OO^+$, 2.6; $SF_4^+$, 2.4; $SF_3O^+$, 92.0; $SF_2OO^+$, 2.0; $SF_3^+$, 27.0; $SF_2O^+$, 19.2; $SFOO^+$, 3.2; $SF_2^+$, 12.0; $SFO^+$, 20.0; $SF^+$, 3.0; $SO^+$, 3.5; $S^+$, 7.8; $O^+$, 2.2.

EXAMPLE 3

Preparation of $SF_5ONF_2$: A sample of $SF_5OCl$ (105 cm.³, 4.69 mmol) was condensed into a 250 ml. Pyrex ampoule at —196° C. together with $N_2F_4$ (47.3 cm.³, 2.11 mmol). After warming to room temperature the ampoule was irradiated for 35 minutes and recooled to —196° C. Subsequent fractionations through traps cooled to —112° C. and —196° C. gave $SF_5ONF_2$ (14.0 cm.³, 0.62 mmol) in the high temperature trap. Identification of the $SF_5ONF_2$ was based on its infrared spectrum (Inorganic Chemistry, 4, 1342, 1965) and vapor density. The low temperature trap contained a mixture (181 cm.³, 8.08 mmol), composed mostly of $SOF_4$ and $Cl_2$ with lesser amounts of $N_2F_4$ and FNO. The yield of $SF_5ONF_2$ was 14 percent.

EXAMPLE 4

Preparation of $SF_5OC(O)Cl$: Chloroxysulfurpentafluoride (127 cm.³, 5.67 mmol) was condensed into a 500 ml. Pyrex ampoule at —196° C. followed by approximately 150 cm.³ of CO (measured by pressure difference). As the ampoule was warming to ambient temperature it was irradiated for 25 minutes. Unreacted CO was pumped out of the ampoule after cooling to —196° C. and the contents were vacuum fractionated through traps cooled to —95° C. and —196° C. The latter fraction (20.8 cm.³, 0.93 mmol) was a mixture of $SOF_4$, COFCl and a trace of $SO_2F_2$ as indicated by an infrared spectrum. The—95° C. fraction was pure $SF_5OC(O)Cl$ (117 cm.³, 5.22 mmol), a 92 percent yield.

Pentafluorosulfur chloroformate is a water-clear liquid and a colorless gas. It is stable at room temperature in glass, stainless steel or Kel-F apparatus. The molecular weight of $SF_5OC(O)Cl$ as determined by vapor density assuming ideal gas behavior was 202 (calculated 206.5). The vapor pressure of $SF_5OC(O)Cl$ over the temperature range —64° C. to 23° C. is [given as T (° K.), P (mm)]: 209.0, 3; 226.8, 12; 251.0, 54; 273.2, 128; 296.8, 319. The vapor pressure-temperature relationship is described by the equation log $P_{mm} = 7.33542 - 1423.85/T$ ° K. The normal boiling point calculated from the equation is 46.4° C., with a heat a vaporization of 6.51 Kcal./mole and a Trouton constant of 20.4.

In the accompanying drawing is set forth a schematic flow diagram illustrating the reaction employed within the spirit and scope of this invention. The flow diagram depicts $SOFE_4$ reacting with ClF in the presence of an MF to give a $SF_5O$ group. The $SF_5O$ group can be reacted with CO, $N_2F_4$, $SF_5O$ or a compound containing an olefin bond to give compounds of the formula $SF_5OR$ wherein R R is —CClO, —NF_2, —OSF_5 or —R_fCl and wherein $R_f$ is a perfluoro alkylene radical.

The chloroxysulfurpentafluoride novel compound of the invention has been shown supra to possess utility for the production of pentafluorosulfur chloroformate and other like compounds such as pentafluorosulfurperoxide and pentafluorosulfur oxydifluoramine. The compounds chloroxysulfurpentafluoride, pentafluorosulfur chloroformate, pentafluorosulfur peroxide and pentafluorosulfur oxydifluoramine also also can be used as polymerization initiators for fluoroolefins such as polymerizing the monomer $CFClCF_2$ to the polymer polychlorotrifluoroethylene. The compounds can also be used as a taxogen in telomerization reactions. The chloroformate, pentafluorosulfur chloroformate may also be used as a flotation agent.

We claim:
1. Chloroxysulfurpentafluoride of the formula $SF_5OCl$.
2. Pentafluorosulfur chloroformate of the formula $SF_5OC(O)Cl$.
3. A process for preparing chloroxysulfurpentafluoride of the formula $SF_5OCl$ comprising reacting chlorine monofluoride and thionyl tetrafluoride at a temperature from —40° to —78° C. in the presence of a member selected from the group consisting of potassium fluoride, rubidium fluoride and cesium fluoride to produce said chloroxysulfurpentafluoride.

References Cited

UNITED STATES PATENTS 3,281,217   10/1966   Firty, Jr. _____ 23—356

OTHER REFERENCES

Merrill et al.: "Bis-(pentafluorosulfur) Peroxide," J. Am. Chem. Soc. 83, 298 (1961).

OSCAR R. VERTIZ, Primary Examiner

H. S. MILLER, Assistant Examiner

U.S. Cl. X.R.
260—543H